(12) United States Patent
Allin (10) Patent No.: US 9,890,880 B2
(45) Date of Patent: Feb. 13, 2018

(54) COMPOSITE COILED TUBING CONNECTORS

(71) Applicant: National Oilwell Varco, L.P., Houston, TX (US)

(72) Inventor: D. Kelly Allin, Houston, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 13/964,720

(22) Filed: Aug. 12, 2013

(65) Prior Publication Data

US 2014/0103646 A1   Apr. 17, 2014

Related U.S. Application Data

(60) Provisional application No. 61/681,895, filed on Aug. 10, 2012.

(51) Int. Cl.
| | |
|---|---|
| *F16L 33/22* | (2006.01) |
| *F16L 17/02* | (2006.01) |
| *B23P 13/00* | (2006.01) |
| *E21B 17/04* | (2006.01) |
| *F16L 23/028* | (2006.01) |

(Continued)

(52) U.S. Cl.
CPC ............... *F16L 17/02* (2013.01); *B23P 13/00* (2013.01); *E21B 17/04* (2013.01); *E21B 17/20* (2013.01); *F16L 23/0286* (2013.01); *F16L 33/18* (2013.01); *F16L 33/2071* (2013.01); *F16L 33/224* (2013.01); *Y10T 29/4943* (2015.01)

(58) Field of Classification Search
CPC ................................. B23P 13/00; E21B 17/04
USPC .......................................... 285/329, 245, 248
See application file for complete search history.

(56) References Cited

U.S. PATENT DOCUMENTS

| 87,993 A | 3/1869 | Weston |
|---|---|---|
| 142,388 A | 9/1873 | Goble |

(Continued)

FOREIGN PATENT DOCUMENTS

| BE | 559688 | 8/1957 |
|---|---|---|
| CA | 2282358 A1 | 8/1998 |

(Continued)

OTHER PUBLICATIONS

Austigard E. and R. Tomter; "Composites Subsea: Cost Effective Products; an Industry Challenge", Subsea 94 International Conference, the 1994 Report on Subsea Engineering: The Continuing Challenges, 17 pages.

(Continued)

*Primary Examiner* — David E Bochna
(74) *Attorney, Agent, or Firm* — Conley Rose, P.C.

(57) ABSTRACT

The invention includes a connector for coupling to a composite pipe, and methods for forming the same. The connector has a seal carrier forming a fluid passage that is made of a first material and that includes a seal receiving portion configured to receive at least one seal and a first coupling surface on an outer seal carrier surface. The connector also has an interconnect with a passage configured to receive the seal carrier that is made of a second material and includes a second coupling surface on an inner interconnect surface configured for coupling with the first coupling surface to connect the seal carrier and the interconnect and a third coupling surface on an outer interconnect surface.

8 Claims, 9 Drawing Sheets

(51) Int. Cl.
  *F16L 33/18* (2006.01)
  *F16L 33/207* (2006.01)
  *E21B 17/20* (2006.01)

(56) References Cited

U.S. PATENT DOCUMENTS

| | | |
|---|---|---|
| 396,176 A | 1/1889 | Simpson |
| 418,906 A | 1/1890 | Bosworth |
| 482,181 A | 9/1892 | Kellom |
| 578,983 A * | 3/1897 | Green ................ F16L 33/24 285/245 |
| 646,887 A | 4/1900 | Stowe et al. |
| 715,641 A * | 12/1902 | Cronk ................ F16L 47/24 285/247 |
| 749,633 A | 1/1904 | Seeley |
| 1,234,812 A | 7/1917 | Simmmons |
| 1,793,455 A | 2/1931 | Buchanan |
| 1,890,290 A | 12/1932 | Hargreaves |
| 1,930,285 A | 10/1933 | Robinson |
| 2,059,920 A * | 11/1936 | Weatherhead, Jr. .... F16L 19/10 285/247 |
| 2,099,407 A | 11/1937 | Raymond |
| 2,178,931 A | 11/1939 | Crites |
| 2,464,416 A | 3/1949 | Raybould |
| 2,467,520 A | 4/1949 | Brubaker |
| 2,481,001 A | 9/1949 | Burckle |
| 2,624,366 A | 1/1953 | Pugh |
| 2,648,720 A | 8/1953 | Alexander |
| 2,690,769 A | 10/1954 | Brown |
| 2,725,713 A | 12/1955 | Blanchard |
| 2,742,931 A | 4/1956 | De Ganahl |
| 2,750,569 A | 6/1956 | Moon |
| 2,810,424 A | 10/1957 | Swartswelter et al. |
| 2,877,027 A * | 3/1959 | Bagnell ................ 285/113 |
| 2,969,812 A | 1/1961 | De Ganahl |
| 2,973,975 A | 3/1961 | Ramberg et al. |
| 2,991,093 A | 7/1961 | Guarnaschelli |
| 3,086,369 A | 4/1963 | Brown |
| 3,116,760 A | 1/1964 | Matthews |
| 3,167,125 A | 1/1965 | Bryan |
| 3,170,137 A | 2/1965 | Brandt |
| 3,212,528 A | 10/1965 | Haas |
| 3,277,231 A | 10/1966 | Downey et al. |
| 3,306,637 A | 2/1967 | Press et al. |
| 3,334,663 A | 8/1967 | Peterson |
| 3,354,292 A | 11/1967 | Kahn |
| 3,354,992 A | 11/1967 | Cook |
| 3,379,220 A | 4/1968 | Kiuchi et al. |
| 3,383,223 A | 5/1968 | Rose |
| 3,390,704 A | 7/1968 | Woodell |
| 3,413,139 A | 11/1968 | Krings |
| 3,459,229 A | 8/1969 | Croft |
| 3,477,474 A | 11/1969 | Mesler |
| 3,507,412 A | 4/1970 | Carter |
| 3,522,413 A | 8/1970 | Chrow |
| 3,526,086 A | 9/1970 | Morgan |
| 3,554,284 A | 1/1971 | Nystrom |
| 3,563,825 A | 2/1971 | Segura |
| 3,579,402 A | 5/1971 | Goldsworthy et al. |
| 3,589,135 A | 6/1971 | Ede et al. |
| 3,589,752 A | 6/1971 | Spencer et al. |
| 3,604,461 A | 9/1971 | Matthews |
| 3,606,396 A | 9/1971 | Prosdocimo et al. |
| 3,606,402 A | 9/1971 | Medney |
| 3,612,580 A | 10/1971 | Jones |
| 3,654,967 A | 4/1972 | Atwell et al. |
| 3,677,978 A | 7/1972 | Dowbenko et al. |
| 3,685,860 A | 8/1972 | Schmidt |
| 3,692,601 A | 9/1972 | Goldsworthy et al. |
| 3,696,332 A | 10/1972 | Dickson, Jr. et al. |
| 3,700,519 A | 10/1972 | Carter |
| 3,701,489 A | 10/1972 | Goldsworthy et al. |
| 3,728,187 A | 4/1973 | Martin |
| 3,730,229 A | 5/1973 | D'Onofrio |
| 3,734,421 A | 5/1973 | Karlson et al. |
| 3,738,637 A | 6/1973 | Goldsworthy et al. |
| 3,740,285 A | 6/1973 | Goldsworthy et al. |
| 3,744,016 A | 7/1973 | Davis |
| 3,769,127 A | 10/1973 | Goldsworthy et al. |
| 3,773,090 A | 11/1973 | Ghersa et al. |
| 3,776,805 A | 12/1973 | Hansen |
| 3,783,060 A | 1/1974 | Goldsworthy et al. |
| 3,790,438 A | 2/1974 | Lewis et al. |
| 3,814,138 A | 6/1974 | Courtot |
| 3,817,288 A | 6/1974 | Ball |
| 3,828,112 A | 8/1974 | Johansen et al. |
| 3,856,052 A | 12/1974 | Feucht |
| 3,858,616 A | 1/1975 | Thiery et al. |
| 3,860,040 A | 1/1975 | Sullivan |
| 3,860,742 A | 1/1975 | Medney |
| 3,866,633 A | 2/1975 | Taylor |
| 3,870,349 A * | 3/1975 | Oetiker ................ F16L 33/222 285/249 |
| 3,901,281 A | 8/1975 | Morrisey |
| 3,907,335 A | 9/1975 | Burge et al. |
| 3,913,624 A | 10/1975 | Ball |
| 3,932,559 A | 1/1976 | Cantor et al. |
| 3,933,180 A | 1/1976 | Carter |
| 3,955,601 A | 5/1976 | Plummer, III |
| 3,956,051 A | 5/1976 | Carter |
| 3,957,410 A | 5/1976 | Goldsworthy et al. |
| 3,960,629 A | 6/1976 | Goldsworthy |
| 3,963,377 A | 6/1976 | Elliott et al. |
| 3,974,862 A | 8/1976 | Fuhrmann et al. |
| 3,980,325 A | 9/1976 | Robertson |
| RE29,112 E | 1/1977 | Carter |
| 4,001,442 A | 1/1977 | Stahlberger et al. |
| 4,007,070 A | 2/1977 | Busdiecker |
| 4,013,101 A | 3/1977 | Logan et al. |
| 4,032,177 A | 6/1977 | Anderson |
| 4,048,807 A | 9/1977 | Ellers et al. |
| 4,053,343 A | 10/1977 | Carter |
| 4,057,610 A | 11/1977 | Goettler et al. |
| 4,067,916 A | 1/1978 | Jaeger |
| 4,095,865 A | 6/1978 | Denison et al. |
| 4,104,095 A | 8/1978 | Shaw |
| 4,108,701 A | 8/1978 | Stanley |
| 4,111,237 A | 9/1978 | Mutzner et al. |
| 4,111,469 A | 9/1978 | Kavick |
| 4,114,393 A | 9/1978 | Engle, Jr. et al. |
| 4,119,122 A | 10/1978 | de Putter |
| 4,125,423 A | 11/1978 | Goldsworthy |
| 4,133,972 A | 1/1979 | Andersson et al. |
| 4,137,949 A | 2/1979 | Linko, III et al. |
| 4,138,178 A | 2/1979 | Miller et al. |
| 4,139,025 A | 2/1979 | Carlstrom et al. |
| 4,148,963 A | 4/1979 | Bourrain et al. |
| 4,190,088 A | 2/1980 | Lalikos et al. |
| 4,196,307 A | 4/1980 | Moore et al. |
| 4,200,126 A | 4/1980 | Fish |
| 4,220,381 A | 9/1980 | van der Graaf et al. |
| 4,226,446 A | 10/1980 | Burrington |
| 4,229,613 A | 10/1980 | Braun |
| 4,241,763 A | 12/1980 | Antal et al. |
| 4,241,787 A | 12/1980 | Price |
| 4,248,062 A | 2/1981 | McLain et al. |
| 4,261,390 A | 4/1981 | Belofsky |
| 4,273,160 A | 6/1981 | Lowles |
| 4,303,263 A | 12/1981 | Legris |
| 4,303,457 A | 12/1981 | Johansen et al. |
| 4,306,591 A | 12/1981 | Arterburn |
| 4,307,756 A | 12/1981 | Voigt et al. |
| 4,308,999 A | 1/1982 | Carter |
| 4,330,017 A | 5/1982 | Satoh et al. |
| 4,336,415 A | 6/1982 | Walling |
| 4,345,784 A | 8/1982 | Walling |
| 4,351,364 A | 9/1982 | Cocks et al. |
| 4,380,252 A | 4/1983 | Gray et al. |
| 4,385,644 A | 5/1983 | Kaempen |
| 4,402,346 A | 9/1983 | Cheetham et al. |
| 4,417,603 A | 11/1983 | Argy |
| 4,421,806 A | 12/1983 | Marks et al. |
| 4,422,801 A | 12/1983 | Hale et al. |
| 4,434,816 A | 3/1984 | Di Giovanni et al. |

(56) References Cited

U.S. PATENT DOCUMENTS

| | | |
|---|---|---|
| 4,445,734 A | 5/1984 | Cunningham |
| 4,446,892 A | 5/1984 | Maxwell et al. |
| 4,447,378 A | 5/1984 | Gray et al. |
| 4,463,779 A | 8/1984 | Wink et al. |
| 4,469,729 A | 9/1984 | Watanabe et al. |
| 4,476,923 A | 10/1984 | Walling |
| 4,488,577 A | 12/1984 | Shilad et al. |
| 4,507,019 A | 3/1985 | Thompson |
| 4,515,737 A | 5/1985 | Karino et al. |
| 4,522,058 A | 6/1985 | Ewing |
| 4,522,235 A | 6/1985 | Kluss et al. |
| 4,530,379 A | 7/1985 | Policelli |
| 4,556,340 A | 12/1985 | Morton |
| 4,567,916 A | 2/1986 | Antal et al. |
| 4,578,675 A | 3/1986 | MacLeod |
| 4,606,378 A | 8/1986 | Meyer et al. |
| 4,627,472 A | 12/1986 | Goettler et al. |
| 4,652,475 A | 3/1987 | Haney et al. |
| 4,657,795 A | 4/1987 | Foret et al. |
| 4,676,563 A | 6/1987 | Curlett et al. |
| 4,681,169 A | 7/1987 | Brookbank, III |
| 4,700,751 A | 10/1987 | Fedrick |
| 4,706,711 A | 11/1987 | Czvikovszky et al. |
| 4,712,813 A | 12/1987 | Passerell et al. |
| 4,728,224 A | 3/1988 | Salama et al. |
| 4,729,106 A | 3/1988 | Rush et al. |
| 4,741,795 A | 5/1988 | Grace et al. |
| 4,758,455 A | 7/1988 | Campbell et al. |
| 4,789,007 A | 12/1988 | Cretel et al. |
| 4,842,024 A | 6/1989 | Palinchak |
| 4,844,516 A | 7/1989 | Baker |
| 4,849,668 A | 7/1989 | Crawley et al. |
| 4,854,349 A | 8/1989 | Foreman |
| 4,859,024 A | 8/1989 | Rahman |
| 4,869,293 A | 9/1989 | Botsolas |
| 4,903,735 A | 2/1990 | Delacour et al. |
| 4,913,657 A | 4/1990 | Naito et al. |
| 4,936,618 A | 6/1990 | Sampa et al. |
| 4,941,774 A | 7/1990 | Harmstorf et al. |
| 4,942,903 A | 7/1990 | Jacobsen et al. |
| 4,972,880 A | 11/1990 | Strand |
| 4,992,787 A | 2/1991 | Helm |
| 4,995,761 A | 2/1991 | Barton |
| 5,024,252 A | 6/1991 | Ochsner |
| 5,048,572 A | 9/1991 | Levine |
| 5,072,622 A | 12/1991 | Roach et al. |
| 5,077,107 A | 12/1991 | Kaneda et al. |
| 5,080,560 A | 1/1992 | LeRoy et al. |
| 5,090,741 A | 2/1992 | Yokomatsu et al. |
| 5,097,870 A | 3/1992 | Williams |
| 5,123,453 A | 6/1992 | Robbins |
| 5,156,206 A | 10/1992 | Cox |
| 5,170,011 A | 12/1992 | Martucci |
| 5,172,765 A | 12/1992 | Sas-Jaworsky et al. |
| 5,176,180 A | 1/1993 | Williams et al. |
| 5,182,779 A | 1/1993 | D'Agostino et al. |
| 5,184,682 A | 2/1993 | Delacour et al. |
| 5,188,872 A | 2/1993 | Quigley |
| 5,209,136 A | 5/1993 | Williams |
| 5,222,769 A | 6/1993 | Kaempen |
| 5,257,663 A | 11/1993 | Pringle et al. |
| 5,261,462 A | 11/1993 | Wolfe et al. |
| 5,265,648 A | 11/1993 | Lyon |
| 5,285,008 A | 2/1994 | Sas-Jaworsky et al. |
| 5,285,204 A | 2/1994 | Sas-Jaworsky |
| 5,330,807 A | 7/1994 | Williams |
| 5,332,269 A | 7/1994 | Homm |
| 5,334,801 A | 8/1994 | Mohn et al. |
| 5,343,738 A | 9/1994 | Skaggs |
| 5,346,658 A | 9/1994 | Gargiulo |
| 5,348,088 A | 9/1994 | Laflin et al. |
| 5,348,096 A | 9/1994 | Williams |
| 5,351,752 A | 10/1994 | Wood et al. |
| RE34,780 E | 11/1994 | Trenconsky et al. |
| 5,364,130 A | 11/1994 | Thalmann |
| 5,373,870 A | 12/1994 | Derroire et al. |
| 5,394,488 A | 2/1995 | Fernald et al. |
| 5,395,913 A | 3/1995 | Bottcher et al. |
| 5,398,729 A | 3/1995 | Spurgat |
| 5,400,602 A | 3/1995 | Chang et al. |
| 5,416,724 A | 5/1995 | Savic |
| 5,423,353 A | 6/1995 | Sorensen |
| 5,426,297 A | 6/1995 | Dunphy et al. |
| 5,428,706 A | 6/1995 | Lequeux et al. |
| 5,435,867 A | 7/1995 | Wolfe et al. |
| 5,437,311 A | 8/1995 | Reynolds |
| 5,437,899 A | 8/1995 | Quigley |
| 5,443,099 A | 8/1995 | Chaussepied et al. |
| 5,452,923 A | 9/1995 | Smith |
| 5,457,899 A | 10/1995 | Chemello |
| 5,460,416 A | 10/1995 | Freidrich et al. |
| RE35,081 E | 11/1995 | Quigley |
| 5,469,916 A | 11/1995 | Sas-Jaworsky et al. |
| 5,472,764 A | 12/1995 | Kehr et al. |
| 5,494,374 A | 2/1996 | Youngs et al. |
| 5,499,661 A | 3/1996 | Odru et al. |
| 5,507,320 A | 4/1996 | Plumley |
| 5,524,937 A | 6/1996 | Sides, III et al. |
| 5,525,698 A | 6/1996 | Bottcher et al. |
| 5,538,513 A | 7/1996 | Okajima et al. |
| 5,551,484 A | 9/1996 | Charboneau |
| 5,558,375 A | 9/1996 | Newman |
| 5,622,211 A | 4/1997 | Martin et al. |
| 5,641,956 A | 6/1997 | Vengsarkar et al. |
| 5,671,811 A | 9/1997 | Head et al. |
| 5,679,425 A | 10/1997 | Plumley |
| 5,683,204 A | 11/1997 | Lawther et al. |
| 5,692,545 A | 12/1997 | Rodrigue |
| 5,718,956 A | 2/1998 | Gladfelter et al. |
| 5,730,188 A | 3/1998 | Kalman et al. |
| 5,755,266 A | 5/1998 | Aanonsen et al. |
| 5,758,990 A | 6/1998 | Davies et al. |
| 5,778,938 A | 7/1998 | Chick et al. |
| 5,785,091 A | 7/1998 | Barker, II |
| 5,795,102 A | 8/1998 | Corbishley et al. |
| 5,797,702 A | 8/1998 | Drost et al. |
| 5,798,155 A | 8/1998 | Yanagawa et al. |
| 5,804,268 A | 9/1998 | Mukawa et al. |
| 5,826,623 A | 10/1998 | Akiyoshi et al. |
| 5,828,003 A | 10/1998 | Thomeer et al. |
| 5,865,216 A | 2/1999 | Youngs |
| 5,868,169 A | 2/1999 | Catallo |
| 5,875,792 A | 3/1999 | Campbell, Jr. et al. |
| 5,902,958 A | 5/1999 | Haxton |
| 5,908,049 A | 6/1999 | Williams et al. |
| 5,913,337 A | 6/1999 | Williams et al. |
| 5,913,357 A | 6/1999 | Hanazaki et al. |
| 5,921,285 A | 7/1999 | Quigley et al. |
| 5,933,945 A | 8/1999 | Thomeer et al. |
| 5,950,651 A | 9/1999 | Kenworthy et al. |
| 5,951,812 A | 9/1999 | Gilchrist, Jr. |
| 5,979,506 A | 11/1999 | Aarseth |
| 5,984,581 A | 11/1999 | McGill et al. |
| 5,988,702 A | 11/1999 | Sas-Jaworsky |
| 6,004,639 A | 12/1999 | Quigley et al. |
| 6,016,845 A | 1/2000 | Quigley et al. |
| 6,032,699 A | 3/2000 | Cochran et al. |
| 6,065,540 A | 5/2000 | Thomeer et al. |
| 6,066,377 A | 5/2000 | Tonyali et al. |
| 6,076,561 A | 6/2000 | Akedo et al. |
| 6,093,752 A | 7/2000 | Park et al. |
| 6,109,306 A | 8/2000 | Kleinert |
| 6,123,110 A | 9/2000 | Smith et al. |
| 6,136,216 A | 10/2000 | Fidler et al. |
| 6,148,866 A | 11/2000 | Quigley et al. |
| RE37,109 E | 3/2001 | Ganelin |
| 6,209,587 B1 | 4/2001 | Hsich et al. |
| 6,220,079 B1 | 4/2001 | Taylor et al. |
| 6,264,244 B1 | 7/2001 | Isennock et al. |
| 6,286,558 B1 | 9/2001 | Quigley et al. |
| 6,315,002 B1 | 11/2001 | Antal et al. |
| 6,328,075 B1 | 12/2001 | Furuta et al. |
| 6,334,466 B1 | 1/2002 | Jani et al. |
| 6,357,485 B2 | 3/2002 | Quigley et al. |

(56) References Cited

U.S. PATENT DOCUMENTS

| | | |
|---|---|---|
| 6,357,966 B1 | 3/2002 | Thompson et al. |
| 6,361,299 B1 | 3/2002 | Quigley et al. |
| 6,372,861 B1 | 4/2002 | Schillgalies et al. |
| 6,390,140 B2 | 5/2002 | Niki et al. |
| 6,397,895 B1 | 6/2002 | Lively |
| 6,402,430 B1 | 6/2002 | Guesnon et al. |
| 6,422,269 B1 | 7/2002 | Johansson et al. |
| 6,461,079 B1 | 10/2002 | Beaujean et al. |
| 6,470,915 B1 | 10/2002 | Enders et al. |
| 6,532,994 B1 | 3/2003 | Enders et al. |
| 6,538,198 B1 | 3/2003 | Wooters |
| 6,557,485 B1 | 5/2003 | Sauter |
| 6,557,905 B2 | 5/2003 | Mack et al. |
| 6,561,278 B2 | 5/2003 | Restarick et al. |
| 6,585,049 B2 | 7/2003 | Leniek, Sr. |
| 6,604,550 B2 | 8/2003 | Quigley et al. |
| 6,620,475 B1 | 9/2003 | Reynolds, Jr. et al. |
| 6,631,743 B2 | 10/2003 | Enders et al. |
| 6,634,387 B1 | 10/2003 | Glejbøl et al. |
| 6,634,388 B1 | 10/2003 | Taylor et al. |
| 6,634,675 B2 | 10/2003 | Parkes |
| 6,663,453 B2 | 12/2003 | Quigley et al. |
| 6,691,781 B2 | 2/2004 | Grant et al. |
| 6,706,348 B2 | 3/2004 | Quigley et al. |
| 6,706,398 B1 | 3/2004 | Revis |
| 6,746,737 B2 | 6/2004 | Debalme et al. |
| 6,764,365 B2 | 7/2004 | Quigley et al. |
| 6,773,774 B1 | 8/2004 | Crook et al. |
| 6,787,207 B2 | 9/2004 | Lindstrom et al. |
| 6,803,082 B2 | 10/2004 | Nichols et al. |
| 6,807,988 B2 | 10/2004 | Powell et al. |
| 6,807,989 B2 | 10/2004 | Enders et al. |
| 6,857,452 B2 | 2/2005 | Quigley et al. |
| 6,868,906 B1 | 3/2005 | Vail, III et al. |
| 6,889,716 B2 | 5/2005 | Lundberg et al. |
| 6,902,205 B2 | 6/2005 | Bouey et al. |
| 6,935,376 B1 | 8/2005 | Taylor et al. |
| 6,978,804 B2 | 12/2005 | Quigley et al. |
| 6,983,766 B2 | 1/2006 | Baron et al. |
| 7,000,644 B2 | 2/2006 | Ichimura et al. |
| 7,021,339 B2 | 4/2006 | Hagiwara et al. |
| 7,025,580 B2 | 4/2006 | Heagy et al. |
| 7,029,356 B2 | 4/2006 | Quigley et al. |
| 7,069,956 B1 | 7/2006 | Mosier |
| 7,080,667 B2 | 7/2006 | McIntyre et al. |
| 7,152,632 B2 | 12/2006 | Quigley et al. |
| 7,234,410 B2 | 6/2007 | Quigley et al. |
| 7,243,716 B2 | 7/2007 | Denniel et al. |
| 7,285,333 B2 | 10/2007 | Wideman et al. |
| 7,306,006 B1 | 12/2007 | Cornell |
| 7,328,725 B2 | 2/2008 | Henry et al. |
| 7,498,509 B2 | 3/2009 | Brotzell et al. |
| 7,523,765 B2 | 4/2009 | Quigley et al. |
| 7,600,537 B2 | 10/2009 | Bhatnagar et al. |
| 7,647,948 B2 | 1/2010 | Quigley et al. |
| 8,187,687 B2 | 5/2012 | Wideman et al. |
| 2001/0006712 A1 | 7/2001 | Hibino et al. |
| 2001/0013669 A1 | 8/2001 | Cundiff et al. |
| 2001/0025664 A1 | 10/2001 | Quigley et al. |
| 2002/0040910 A1 | 4/2002 | Pahl |
| 2002/0081083 A1 | 6/2002 | Griffioen et al. |
| 2002/0094400 A1 | 7/2002 | Lindstrom et al. |
| 2002/0119271 A1 | 8/2002 | Quigley et al. |
| 2002/0185188 A1 | 12/2002 | Quigley et al. |
| 2003/0008577 A1 | 1/2003 | Quigley et al. |
| 2003/0087052 A1 | 5/2003 | Wideman et al. |
| 2004/0014440 A1 | 1/2004 | Makela et al. |
| 2004/0025951 A1 | 2/2004 | Baron et al. |
| 2004/0052997 A1 | 3/2004 | Santo |
| 2004/0074551 A1 | 4/2004 | McIntyre |
| 2004/0094299 A1 | 5/2004 | Jones |
| 2004/0096614 A1 | 5/2004 | Quigley et al. |
| 2004/0134662 A1 | 7/2004 | Chitwood et al. |
| 2004/0226719 A1 | 11/2004 | Morgan et al. |
| 2004/0265524 A1 | 12/2004 | Wideman et al. |
| 2005/0087336 A1 | 4/2005 | Surjaatmadja et al. |
| 2005/0189029 A1 | 9/2005 | Quigley et al. |
| 2006/0000515 A1 | 1/2006 | Huffman |
| 2006/0054235 A1 | 3/2006 | Cohen et al. |
| 2006/0144456 A1 | 7/2006 | Donnison et al. |
| 2006/0249508 A1 | 11/2006 | Teufl et al. |
| 2007/0040910 A1 | 2/2007 | Kuwata |
| 2007/0125439 A1 | 6/2007 | Quigley et al. |
| 2007/0154269 A1 | 7/2007 | Quigley et al. |
| 2007/0187103 A1 | 8/2007 | Crichlow |
| 2007/0246459 A1 | 10/2007 | Loveless et al. |
| 2007/0296209 A1 | 12/2007 | Conley et al. |
| 2008/0006337 A1 | 1/2008 | Quigley et al. |
| 2008/0006338 A1 | 1/2008 | Wideman et al. |
| 2008/0014812 A1 | 1/2008 | Quigley et al. |
| 2008/0164036 A1 | 7/2008 | Bullen |
| 2008/0185042 A1 | 8/2008 | Feechan et al. |
| 2008/0210329 A1 | 9/2008 | Quigley et al. |
| 2009/0090460 A1 | 4/2009 | Wideman et al. |
| 2009/0107558 A1 | 4/2009 | Quigley et al. |
| 2009/0173406 A1 | 7/2009 | Quigley et al. |
| 2009/0194293 A1 | 8/2009 | Stephenson et al. |
| 2009/0278348 A1 | 11/2009 | Brotzell et al. |
| 2009/0295154 A1 | 12/2009 | Weil et al. |
| 2010/0101676 A1 | 4/2010 | Quigley et al. |
| 2010/0212769 A1 | 8/2010 | Quigley et al. |
| 2010/0218944 A1 | 9/2010 | Quigley et al. |
| 2011/0013669 A1 | 1/2011 | Raj et al. |
| 2011/0147492 A1 | 6/2011 | Gilpatrick |
| 2012/0216903 A1 | 8/2012 | Osborne |

FOREIGN PATENT DOCUMENTS

| | | |
|---|---|---|
| CH | 461199 | 8/1968 |
| DE | 1959738 A1 | 6/1971 |
| DE | 3603597 | 8/1987 |
| DE | 4040400 A1 | 8/1992 |
| DE | 4214383 C1 | 9/1993 |
| DE | 19905448 A1 | 8/2000 |
| DE | 102005061516 A1 | 7/2007 |
| DE | 202008007137 U1 | 10/2008 |
| EP | 0024512 | 3/1981 |
| EP | 0203887 A2 | 12/1986 |
| EP | 0352148 A1 | 1/1990 |
| EP | 0427306 A2 | 5/1991 |
| EP | 0477704 A1 | 4/1992 |
| EP | 0503737 A1 | 9/1992 |
| EP | 0505815 A2 | 9/1992 |
| EP | 0536844 A1 | 4/1993 |
| EP | 0681085 A2 | 11/1995 |
| EP | 0854029 A2 | 7/1998 |
| EP | 0953724 A2 | 11/1999 |
| EP | 0970980 | 1/2000 |
| EP | 0981992 A1 | 3/2000 |
| FR | 989204 | 9/1951 |
| GB | 553110 A | 5/1943 |
| GB | 809097 | 2/1959 |
| GB | 909187 | 10/1962 |
| GB | 956500 | 4/1964 |
| GB | 1297250 | 11/1972 |
| GB | 2103744 A | 2/1983 |
| GB | 2159901 A | 12/1985 |
| GB | 2193006 A | 1/1988 |
| GB | 2255994 A | 11/1992 |
| GB | 2270099 A | 3/1994 |
| GB | 2365096 A | 2/2002 |
| JP | 02-163592 | 6/1990 |
| WO | WO-1987/004768 A1 | 8/1987 |
| WO | WO-1991/013925 A1 | 9/1991 |
| WO | WO-1992/021908 A1 | 12/1992 |
| WO | WO-1993/007073 A1 | 4/1993 |
| WO | WO-1993/019927 A1 | 10/1993 |
| WO | WO-1995/002782 A1 | 1/1995 |
| WO | WO-1997/012115 A2 | 4/1997 |
| WO | WO-1997/012166 A1 | 4/1997 |
| WO | WO-1997/048932 A1 | 12/1997 |
| WO | WO-1999/019653 A1 | 4/1999 |
| WO | WO-1999/061833 A1 | 12/1999 |
| WO | WO-2000/009928 A1 | 2/2000 |

(56) References Cited

FOREIGN PATENT DOCUMENTS

| WO | WO-2000/031458 A1 | 6/2000 |
|---|---|---|
| WO | WO-2000/073695 A1 | 12/2000 |
| WO | WO-2006/003208 A1 | 1/2006 |

OTHER PUBLICATIONS

Connell Mike et al.; "Coiled Tubing: Application for Today's Challenges", Petroleum Engineer International, pp. 18-21 (Jul. 1999), 6 pages.

Dalmolen "The Properties, Qualification, and System Design of, and Field Experiences with Reinforced Thermoplastic Pipe for Oil and Gas Applications" NACE International, 2003 West Conference (Feb. 2003), 11 pages.

Feechan Mike et al.; "Spoolable Composites Show Promise", The American Oil & Gas Reporter, pp. 44-50 (Sep. 1999), 8 pages.

Fiberspar Tech Notes, "Horizontal well deliquification just got easier-with Fiberspar Spoolable Production Systems," TN21-R1UN1-HybridLift, 2010, 2 pages.

Fowler Hampton; "Advanced Composite Tubing Usable", The American Oil & Gas Reporter, pp. 76-81 (Sep. 1997), 4 pages.

Fowler Hampton et al.; "Development Update and Applications of an Advanced Composite Spoolable Tubing", Offshore Technology Conference held in Houston Texas from May 4 to 7, 1998, pp. 157-162.

Hahn H. Thomas and Williams G. Jerry; "Compression Failure Mechanisms in Unidirectional Composites". NASA Technical Memorandum pp. 1-42 (Aug. 1984), 44 pages.

Hansen et al.; "Qualification and Verification of Spoolable High Pressure Composite Service Lines for the Asgard Field Development Project", paper presented at the 1997 Offshore Technology Conference held in Houston Texas from May 5 to 8, 1997, pp. 45-54.

Hartman, D.R., et al., "High Strength Glass Fibers," Owens Corning Technical Paper (Jul. 1996), 16 pages.

Haug et al.; "Dynamic Umbilical with Composite Tube (DUCT)", Paper presented at the 1998 Offshore Technology Conference held in Houston Texas from 4th to 7th, 1998; pp. 699-712.

International Search Report for International Patent Application No. PCT/US2000/026977 dated Jan. 22, 2001, 3 pages.

International Search Report for International Patent Application No. PCT/US2000/041073 dated Mar. 5, 2001, 3 pages.

International Search Report and Written Opinion for International Patent Application No. PCT/US2004/016093 dated Nov. 8, 2005, 8 pages.

International Search Report and Written Opinion for International Patent Application No. PCT/US2010/060582 dated Feb. 16, 2011, 11 pages.

International Search Report and Written Opinion for International Patent Application No. PCT/US2013/054533 dated Nov. 29, 2013, 13 pages.

Lundberg et al.; "Spin-off Technologies from Development of Continuous Composite Tubing Manufacturing Process", Paper presented at the 1998 Offshore Technology Conference held in Houston, Texas from May 4 to 7, 1998 pp. 149-155.

Marker et al.; "Anaconda: Joint Development Project Leads to Digitally Controlled Composite Coiled Tubing Drilling System", Paper presented at the SPEI/COTA, Coiled Tubing Roundtable held in Houston, Texas from Apr. 5 to 6, 2000, pp. 1-9.

Measures et al.; "Fiber Optic Sensors for Smart Structures", Optics and Lasers Engineering 16: 127-152 (1992).

Measures R. M.; "Smart Structures with Nerves of Glass". Prog. Aerospace Sci. 26(4): 289-351 (1989).

Mesch, K.A., "Heat Stabilizers," Kirk-Othmer Encyclopedia of Chemical Technology, 2000 pp. 1-20.

Moe Wood T. et al.; "Spoolable, Composite Piping for Chemical and Water Injection and Hydraulic Valve Operation", Proceedings of the 11th International Conference on Offshore Mechanics and Arctic Engineering-I 992-, vol. III, Part A—Materials Engineering, pp. 199-207 (1992).

Quigley et al.; "Development and Application of a Novel Coiled Tubing String for Concentric Workover Services", Paper presented at the 1997 Offshore Technology Conference held in Houston, Texas from May 5 to 8, 1997, pp. 189-202.

Rispler K. et al.; "Composite Coiled Tubing in Harsh Completion/Workover Environments", Paper presented at the SPE GAS Technology Symposium and Exhibition held in Calgary, Alberta, Canada, on Mar. 15-18, 1998, pp. 405-410.

Sas-Jaworsky II Alex.; "Developments Position CT for Future Prominence", The American Oil & Gas Reporter, pp. 87-92 (Mar. 1996).

Sas-Jaworsky II and Bell Steve "Innovative Applications Stimulate Coiled Tubing Development", World Oil, 217(6): 61 (Jun. 1996), 7 pages.

Sas-Jaworsky II and Mark Elliot Teel; "Coiled Tubing 1995 Update: Production Applications", World Oil, 216 (6): 97 (Jun. 1995 ), 9 pages.

Sas-Jaworsky, A. and J.G. Williams, "Advanced composites enhance coiled tubing capabilities", World Oil, pp. 57-69 (Apr. 1994).

Sas-Jaworsky, A. and J.G. Williams, "Development of a composite coiled tubing for oilfield services", Society of Petroleum Engineers, SPE 26536, pp. 1-11 (1993).

Sas-Jaworsky, A. and J.G. Williams, "Potential applications and enabling capabilities of composite coiled tubing", Proceedings of World Oil's 2nd International Conference on Coiled Tubing Technology, (1994), 16 pages.

Shuart J. M. et al.; "Compression Behavior of $\neq 45$o-Dominated Laminates with a Circular Hole or Impact Damage", AIAA Journal 24(1):115-122 (Jan. 1986).

Silverman A. Seth; "Spoolable Composite Pipe for Offshore Applications", Materials Selection & Design pp. 48-50 (Jan. 1997).

Sperling, L.H., "Introduction to Physical Polymer Science 3rd Edition," Wiley-Interscience, New York, NY, 2001, 3 pages.

Williams, J. G. et al.; "Composite Spoolable Pipe Development, Advancements, and Limitations", Paper presented at the 2000 Offshore Technology Conference held in Houston Texas from May 1 to 4, 2000, 16 pages.

Williams, J. G., "Oil Industry Experiences with Fiberglass Components," Offshore Technology Conference, 1987, pp. 211-220.

Poper Peter; "Braiding", International Encyclopedia of Composites, Published by VGH, Publishers, Inc., 220 East 23rd Street, Suite 909, New York, NY I0010, Apr. 18, 2007, 18 pages.

Mexican Patent Application No. MX/a/2015/001863 Office Action dated Nov. 6, 2017 (4 pages).

\* cited by examiner

COMPOSITE COILED TUBING CONNECTORS

CROSS-REFERENCE TO RELATED APPLICATION

The current application claims priority to U.S. Ser. No. 61/681,895, filed Aug. 10, 2012, which is hereby incorporated by reference in its entirety.

FIELD OF THE INVENTION

This application relates generally to connectors for use with a spoolable pipe constructed of composite material and more particularly to a connector formed of a plurality of parts.

BACKGROUND

A spoolable pipe in common use is steel coiled tubing which finds a number of uses in oil well operations. For example, it is used in running wireline cable down hole with well tools, such as logging tools and perforating tools. Such tubing is also used in the workover of wells, to deliver various chemicals downhole and perform other functions. Coiled tubing offers a much faster and less expensive way to run pipe into a wellbore in that it eliminates the time consuming task of joining typical 30 foot pipe sections by threaded connections to make up a pipe string that typically will be up to 10,000 feet or longer.

Steel coiled tubing is capable of being spooled because the steel used in the product exhibits high ductility (i.e. the ability to plastically deform without failure). The spooling operation is commonly conducted while the tube is under high internal pressure which introduces combined load effects. Unfortunately, repeated spooling and use can cause fatigue damage and the steel coiled tubing can suddenly fracture and fail. The hazards of operation, and the risk to personnel and the high economic cost of failure resulting in down time to conduct fishing operations, typically forces the product to be retired before any expected failure after a relatively few number of trips into a well. The cross section of steel tubing may expand during repeated use, resulting in reduced wall thickness and higher bending strains with associated reduction in the pressure carrying capability. Steel coiled tubing presently in service is generally limited to internal pressures of about 5000 psi. Higher internal pressure significantly reduces the integrity of coiled tubing so that it will not sustain continuous flexing and thus severely limits its service life.

It is therefore desirable to provide a substantially non-ferrous spoolable pipe capable of being deployed and spooled under borehole conditions and which does not suffer from the structural limitations of steel tubing, and which is also highly resistant to chemicals. Such non-ferrous spoolable pipe often carries fluids which may be transported from the surface to a downhole location, as in the use of coiled tubing, to provide means for treating formations or for operating a mud motor to drill through the formations. In addition, it may be desirable to transport devices through the spoolable pipe, such as through a coiled tubing bore to a downhole location for various operations. Therefore, an open bore within the spoolable pipe is essential for some operations.

In the case of coiled tubing, external pressures can also be a major load condition and can be in excess of 2500 psi. Internal pressure may range from 5,000 psi to 10,000 psi in order to perform certain well operations; for example, chemical treatment or fracturing. Tension and compression forces on coiled tubing are severe in that the tubing may be forced into or pulled from a borehole against frictional forces in excess of 20,000 lbf.

For the most part, prior art non-metallic tubular structures that are designed for being spooled and also for transporting fluids, are made as a hose, whether or not they are called a hose. An example of such a hose is the Feucht structure in U.S. Pat. No. 3,856,052, which has longitudinal reinforcement in the side walls to permit a flexible hose to collapse preferentially in one plane. However, the structure is a classic hose with vulcanized polyester cord plies which are not capable of carrying compression loads or high external pressure loads. Hoses typically use an elastomer such as rubber to hold fiber together, but do not use a high modulus plastic binder such as epoxy. Hoses are generally designed to bend and carry internal pressure, but are not normally subjected to external pressure or high axial compression or tension loads. For an elastomeric type material, such as that often used in hoses, the elongation at break is so high (typically greater than 400 percent) and the stress-strain response so highly nonlinear, it is common practice to define a modulus corresponding to a specified elongation. The modulus for an elastomeric material corresponding to 200 percent elongation typically ranges from 300 psi to 2000 psi. The modulus of elasticity for plastic matrix material typically used in a composite tube tends to range from about 100,000 psi to about 500,000 psi or greater, with representative strains to failure of from about 2 percent to about 10 percent. This large difference in modulus and strain to failure between rubber and plastics, and thus between hoses and composite tubes, is part of what permits a hose to be easily collapsed to an essentially flat condition under relatively low external pressure and eliminates the capability of the hose to carry high axial tension or compression loads, while the higher modulus characteristic of the plastic matrix material used in a composite tube tends to be sufficiently stiff to transfer loads into the fibers and thus resist high external pressure, axial tension, and compression without collapse. Constructing a composite tube to resist high external pressure and compressive loads may include the use of complex composite mechanics engineering principles to ensure that the tube has sufficient strength. It has not been previously considered feasible to build a truly composite tube capable of being bent to a relatively small diameter, and be capable of carrying internal pressure and high tension and compression loads in combination with high external pressure requirements. Specifically, a hose is not expected to sustain high compression and external pressure loads.

In operations involving spoolable pipe, it is often necessary to make various connections, such as to interconnect long sections or to connect tools or other devices into or at the end of the pipe string. With steel coiled tubing, a variety of well-known connecting techniques are available to handle the severe loads encountered in such operations. Threaded connections as well as welded connections are often applied and meet the load requirements described.

Grapple and slip type connectors have also been developed for steel coiled tubing to provide a low profile while being field serviceable. However, these steel tubing connectors tend not to be applicable to modern composite coiled tubing. One such connector is shown in U.S. Pat. No. 4,936,618 to Sampa et al., showing a pair of wedge rings for making a gripping contact with the coiled tubing. The PETRO-TECH Tools Incorporated catalog shows coiled tubing E-Z Connectors, Product Nos. 9209 to 9211 that are also examples of a slip type steel coiled tubing connector.

Another connector for reeled thin-walled tubing is shown in U.S. Pat. No. 5,156,206 to Cox, and uses locking slips for engaging the tubing in an arrangement similar to the Petro-Tech connector. U.S. Pat. No. 5,184,682 to Delacour et al. shows a connector having a compression ring for engaging a rod for use in well operations, again using a technique similar to a Petro-Tech connector to seal against the rod.

These commercial coiled tubing connectors would not be expected to seal properly to a composite pipe, partially because of circumferential deformation of the pipe inwardly when the connector is on the composite pipe, and also because the external surface of a composite tube or pipe tends not to be as regular in outer diameter tolerance as a steel hose.

U.S. Pat. No. 4,530,379 to Policelli teaches a composite fiber tubing with a structural transition from the fiber to a metallic connector. The fibers may be graphite, carbon, aramid or glass. The FIG. 4 embodiment can be employed in a fluid conveyance pipe having bending loads in addition to internal pressure loads, and in structural members having bending and axial stiffness requirements.

While many connectors designed for application to elastomeric hoses and tubes, such as shown in U.S. Pat. No. 3,685,860 to Schmidt, and U.S. Pat. No. 3,907,335 to Burge et al., sealing to these hoses is substantially different in that the hose body itself serves as a sealing material when pressed against the connecting members. A composite pipe would be considered too rigid to function in this way. U.S. Pat. No. 4,032,177 to Anderson shows an end fitting for a non-metallic tube such as a plastic tube and having a compression sleeve and a tubing reinforcing insert, but again appears to rely on the tube being deformable to the extent of effecting a seal when compressed by the coupling.

Another coupling for non-metallic natural gas pipe is shown in U.S. Pat. No. 4,712,813 to Passerell et al., and appears to show a gripping collet for engaging the outer tubular surface of the pipe and a sealing arrangement for holding internal gas pressure within the pipe, but no inner seals are on the pipe and seals cannot be changed without disturbing the gripping mechanism.

U.S. Pat. No. 5,351,752 to Wood et al. appears to show a bonded connector for coupling composite tubing sections for pumping a well. The composite tubing has threaded fittings made of composite materials which are bonded to the tubing.

Often, connectors (e.g., interconnects, flanges, and other components for connecting the end of tubing to other elements) are formed from a single piece of bar stock. Because of the dimensional differences between different sections (e.g., a narrower section to fit in the tubing and a thicker section to extend beyond the tubing), the bar stock must be machined down from the thickest dimension, often resulting in a sizable loss of material. Additionally, forming the connector from a single piece of bar stock limits the connector to a single material. This may further increase material costs when a more expensive material is required for only certain portions of the connector but is used for the entire connector.

SUMMARY

In view of the foregoing, there is a need for a connector that minimizes the loss of material through processing and allows for the use of different materials in a single connector.

The present invention includes connectors (and methods for forming the same) having multiple parts. The individual components may be formed and/or machined from materials relatively similarly dimensioned to the final product to lessen the loss of material. Additionally, creating components from different pieces of stock material enables the use of different kinds of material in the final connector.

In one aspect, the invention includes a connector for coupling to a composite pipe. The connector has a seal carrier forming a fluid passage that is made of a first material and that includes a seal receiving portion configured to receive at least one seal and a first coupling surface on an outer seal carrier surface. The connector also has an interconnect with a passage configured to receive the seal carrier that is made of a second material and includes a second coupling surface on an inner interconnect surface configured for coupling with the first coupling surface to connect the seal carrier and the interconnect and a third coupling surface on an outer interconnect surface.

In one embodiment, the first material is stainless steel (e.g., ASTM A316/316L Stainless Steel). In another embodiment, the seal receiving portion has at least one groove. In some embodiments the first coupling surface is a threaded surface, while in other embodiments the first coupling surface is a smooth surface. The second material may be different from the first material, and the second material may be carbon steel (e.g., ASTM A106 Carbon Steel). The second coupling surface may be a threaded surface in certain embodiments, and may be a smooth surface in other embodiments. The third coupling surface may be a threaded surface. In certain embodiments, a maximum outer diameter of the seal carrier is substantially equal to or less than a minimum inner diameter of the interconnect.

Another aspect of the invention includes a method of forming a connector for a composite pipe. The method includes providing a first stock material and processing the first stock material to form a seal carrier (e.g., a mandrel). The seal carrier includes a seal receiving portion configured to receive at least one seal and a first coupling surface on an outer seal carrier surface. The method also includes providing a second stock material and processing the second stock material to form an interconnect. The interconnect includes a second coupling surface on an inner interconnect surface configured for coupling with the first coupling surface to connect the seal carrier and the interconnect and a third coupling surface on an outer interconnect surface.

In one embodiment, the first stock material comprises bar stock, which may be machined to a lesser diameter. In some embodiments, the second stock material comprises bar stock that may be machined to a lesser diameter. A maximum diameter of the first stock material may be less than a maximum diameter of the second stock material. In another embodiment, a maximum outer diameter of the seal carrier is substantially equal to or less than a minimum inner diameter of the interconnect.

Yet another aspect of the invention includes a flange for coupling to a composite pipe. The flange has an insert with a fluid passage and a first coupling surface, and is made of a first material. The flange also has an interconnect with a second coupling surface configured for coupling with the first coupling surface to connect the insert and the interconnect and a third coupling surface, and is made from a second material.

In certain embodiments the first and/or the second material are stainless steel, carbon steel, corrosion resistant alloys, composites, coated materials, or combinations thereof. The first and second materials may be different materials, or they may be the same material. The insert may further include a lip. In some embodiments, the third coupling surface is substantially perpendicular to the second coupling surface. The third coupling surface may have a plurality of openings, which may be disposed in a standard bolt pattern. At least one of the insert and the interconnect may be machined from bar stock, and the insert and the interconnect may be configured to be press fit together.

These and other objects, along with advantages and features of the present invention, will become apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

While this invention is directed generally to providing connectors for composite spoolable pipe, the disclosure is directed to a specific application involving line pipe, coiled tubing service and downhole uses of coiled tubing. Composite coiled tubing offers the potential to exceed the performance limitations of isotropic metals, thereby increasing the service life of the pipe and extending operational parameters. Composite coiled tubing is constructed as a continuous tube fabricated generally from non-metallic materials to provide high body strength and wear resistance. This tubing can be tailored to exhibit unique characteristics which optimally address burst and collapse pressures, pull and compression loads, and high strains imposed by bending. This enabling capability expands the performance parameters beyond the physical limitations of steel or alternative isotropic material tubulars. In addition, the fibers and resins used in composite coiled tubing construction help make the tube impervious to corrosion and resistant to chemicals used in treatment of oil and gas wells.

High performance composite structures are generally constructed as a buildup of laminant layers with the fibers in each layer oriented in a particular direction or directions. These fibers are normally locked into a preferred orientation by a surrounding matrix material. The matrix material, normally much weaker than the fibers, serves the critical role of transferring load into the fibers. Fibers having a high potential for application in constructing composite pipe include glass, carbon, and aramid. Epoxy or thermoplastic resins are good candidates for the matrix material.

The connector of the present invention can have application to any number of composite tube designs, including configured to be applied to a pipe having an outer surface made from a composite material that can receive gripping elements which can penetrate into the composite material without destroying the structural integrity of the outer surface. This outer surface can act as a wear surface as the pipe engages the surface equipment utilized in handling such pipe. The composite pipe is suitable for use in wellbores or as line pipe. Several connectors for similar uses are described in U.S. Patent Publication No. 20090278348, the entirety of which is incorporated herein by reference. Some of the components, such as slip nuts, may be used interchangeably with the connectors described below.

Figure 1A:
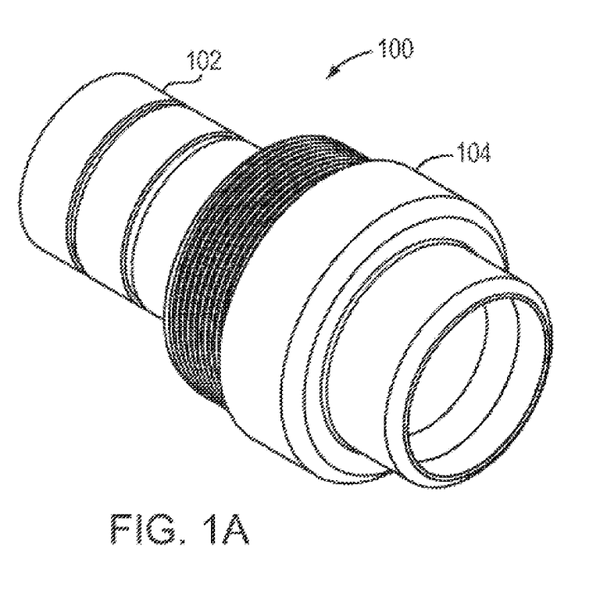
FIG. 1A is a schematic perspective view of a service end connector, in accordance with one embodiment of the invention.
Figure 1B:
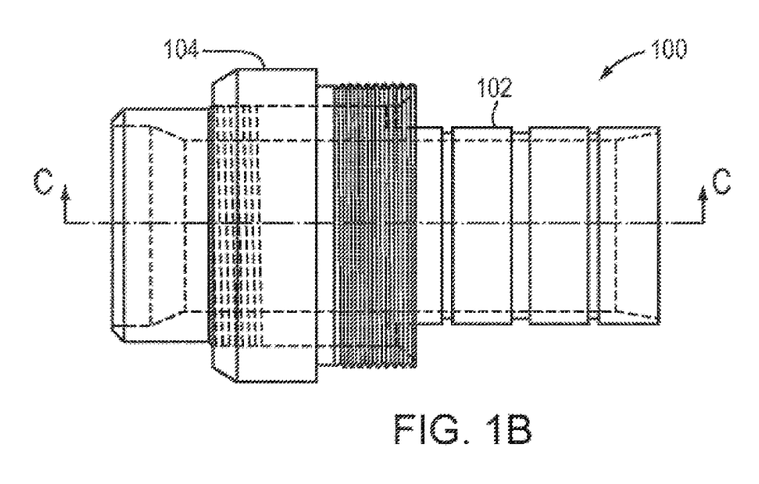
FIG. 1B is a schematic, transparent side view of the service end connector depicted in FIG. 1A.
Figure 1C:
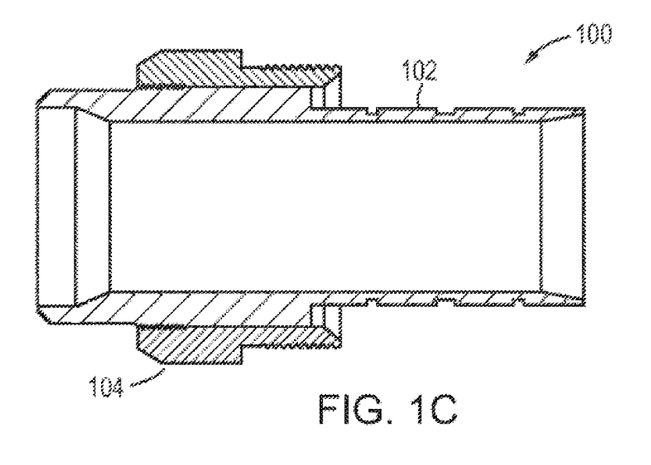
FIG. 1C is a schematic cross-section view of the service end connector taken along the line C-C in FIG. 1B.

FIGS. 1A-1C depict a service end connector 100 for attaching a composite pipe to a service member, such as a logging tool, t-fitting, or flange. The end connector 100 may be assembled from two components, e.g., a seal carrier 102 and an interconnect 104. The interconnect 104 may be sized to fit over the seal carrier 102. The interconnect 104 and the seal carrier 102 may be connected to each other via a number of techniques, including a threaded connection and/or a press fit.

Figure 2A:
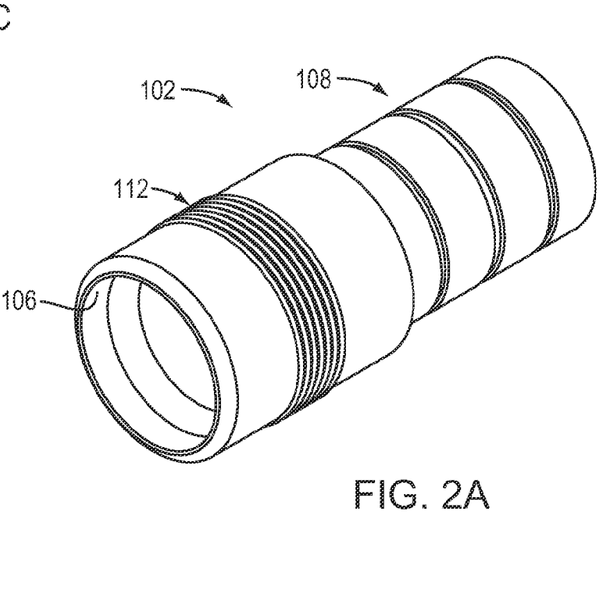
FIG. 2A is a schematic perspective view of a seal carrier of the service end connector depicted in FIG. 1A.
Figure 2B:
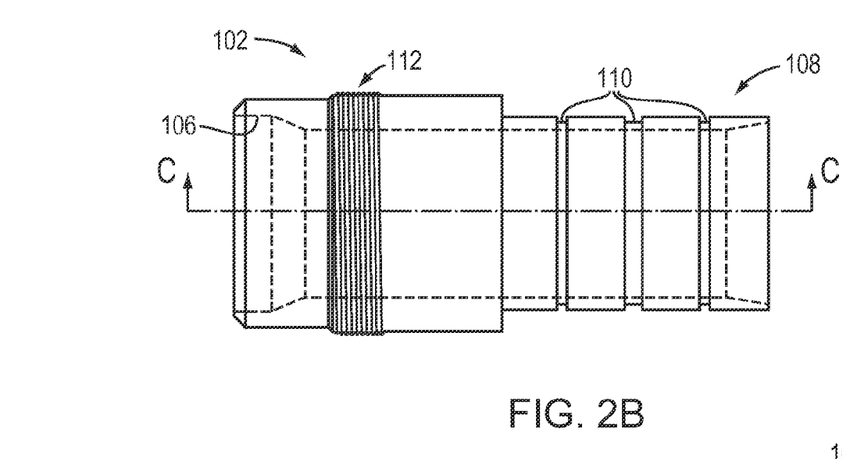
FIG. 2B is a schematic transparent side view of the seal carrier depicted in FIG. 2A.
Figure 2C:
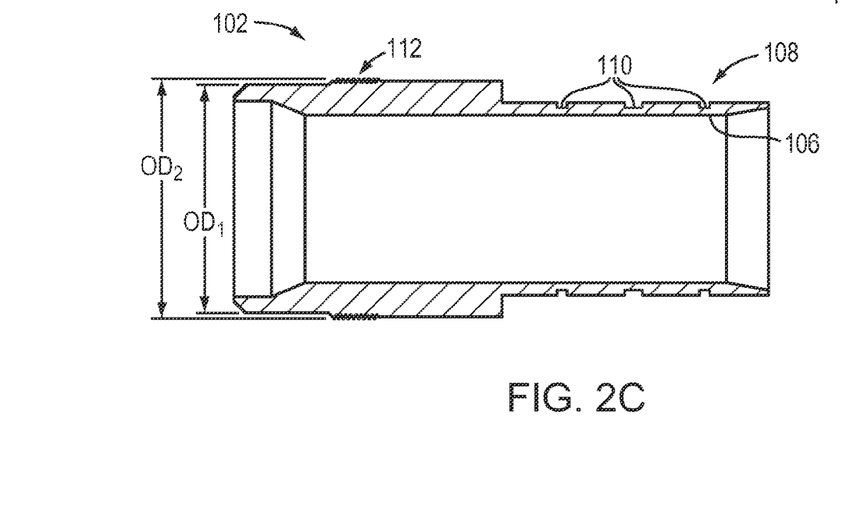
FIG. 2C is a schematic cross-section view of the seal carrier taken along the line C-C in FIG. 2B.

FIGS. 2A-2C depict the seal carrier 102. The seal carrier 102 may define a fluid passage 106 running the length of the seal carrier 102, thereby allowing a fluid to pass freely therethrough. A seal receiving portion 108 may be located on an outer surface of the seal carrier 102, e.g., at an end of the seal carrier 102, to receive seals for providing a fluid tight connection with a composite pipe. Grooves 110 may be formed in the seal receiving portion 108 to limit movement of the seals. The seal carrier 102 may also have a first coupling surface 112 on an outer surface thereof. The first coupling surface 112 may form an outer diameter indicated in FIG. 2C as $OD_1$, that may represent a maximum outer diameter of the seal carrier 102 (particularly when the first coupling surface 112 is a smooth surface). In embodiments where the first coupling surface 112 is a threaded surface, the ends of the threads may extend nominally beyond the diameter $OD_1$, instead having a maximum diameter as indicated by $OD_2$. The maximum outer diameter is the minimum size of stock material that may be used in forming the seal carrier 102. In various embodiments, the maximum outer diameter of the seal carrier 102 may be about one inch to about twelve inches, although dimensions above and below this range are also contemplated. The seal carrier 102 may be about six inches to about thirty-six inches in length, although embodiments of less than six inches in length and greater than thirty-six inches in length are contemplated. The seal carrier 102 may be made of any of a variety of materials, including carbon steel, stainless steel, corrosion resistant alloys, and/or composites.

Figure 3A:
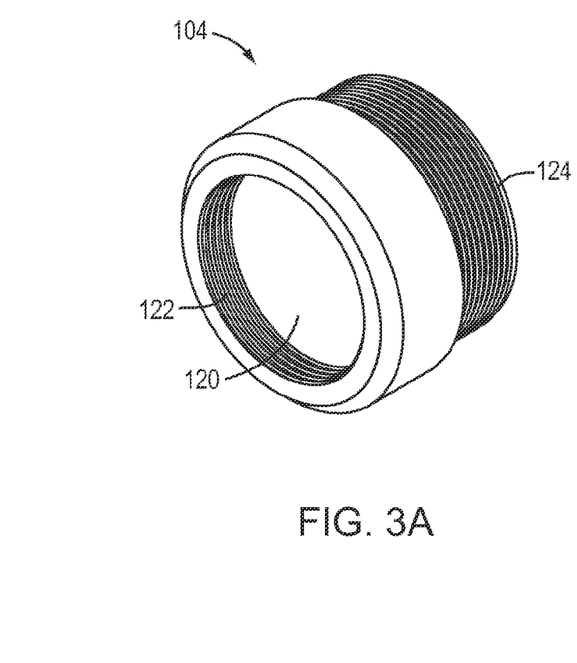
FIG. 3A is a schematic perspective view of an interconnect of the service end connector depicted in FIG. 1A.
Figure 3B:
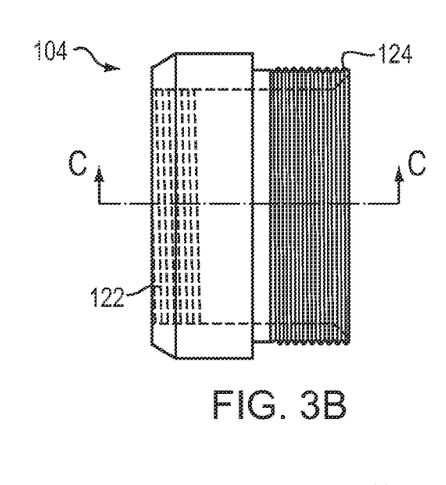
FIG. 3B is a schematic, transparent side view of the interconnect depicted in FIG. 3A.
Figure 3C:
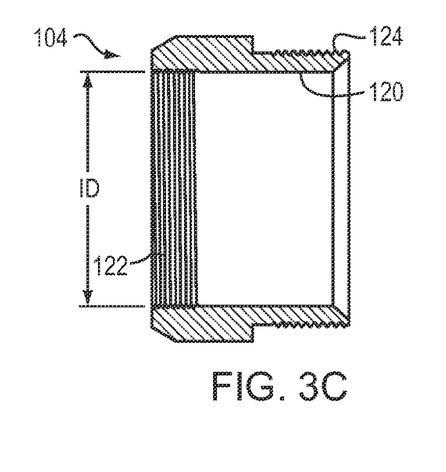
FIG. 3C is a schematic cross-section view of the interconnect taken along the line C-C in FIG. 3B.

FIGS. 3A-3C depict the interconnect 104 for use with the seal carrier 102. A passage 120 may extend through the interconnect 104, allowing for movement of the interconnect 104 over the seal carrier 102. The passage 120 may define an inner diameter of the interconnect 104, as indicated by 'ID' in FIG. 3C. The inner diameter ID may be substantially equal to or greater than the outer diameter $OD_1$ or $OD_2$. Any overlap between the dimensions due to thread height are likely to be minimal and the inner diameter ID would still be considered to be substantially equal to or greater than the outer diameter $OD_2$. The interconnect 104 may have a second coupling surface 122 on an inner surface thereof for coupling with the first coupling surface 112. The second coupling surface 122 may be complementary with the first coupling surface 112, e.g., both are threaded (as depicted) or both are smooth (for a press fit). An outer surface of the interconnect 104 may have a third coupling surface 124 for attachment to other components, e.g., a slip nut for securing the pipe or downhole tools. In various embodiments, the interconnect 104 may be about one inch to about twelve inches in length, and may be shorter than one inch or longer than twelve inches. The interconnect 104 may be made of a variety of materials, including carbon steel, stainless steel, corrosion resistant alloys, and/or composites. As the seal carrier 102 and the interconnect 104 are separate components, they may easily be made of different materials. Use of high cost materials may be limited to the component where they are needed, thereby saving in material costs. Material and machining costs may also be reduced over unitary constructions by starting the formation process with stock materials closer in size to the finished components. For example, the service end connector 102 may be formed by providing a first stock material (e.g., bar stock) with dimensions approximately similar to the final dimensions of the seal carrier 102. The stock material may be machined to add the features of the seal carrier 102, e.g., the receiving portion 108 and the first coupling surface 112, by reducing the outer diameter of certain portions. Depending on the material used, the seal carrier 102 may be otherwise formed, e.g., by molding. A second stock material (e.g., bar stock) may be provided with dimensions approximately similar to the final dimensions of the interconnect 104, then machined to add the required features, e.g., the second coupling surface 122 and the third coupling surface 124, by reducing the outer diameter of the second bar stock (and increasing the inner diameter) in selected areas. As the seal carrier 102 generally has a lesser outer diameter than the interconnect 104, the first stock material may have a lesser maximum diameter than a maximum diameter of the second stock material. Once the seal carrier 102 and the interconnect 104 are formed, they may be combined by many known methods, including the threaded connection depicted in FIGS. 1A-C.

In other embodiments, processes other than those described above may be used to make the seal carrier 102 and the interconnect 104. For example, the seal carrier 102 and the interconnect 104 may be made by casting, forging, molding, extruding, and other known fabrication methods. The seal carrier 102 and the interconnect 104 may be made with the same process, or may be made with different processes. The seal carrier 102 and the interconnect 104 may each be made through multiple known processes.

Figure 4A:
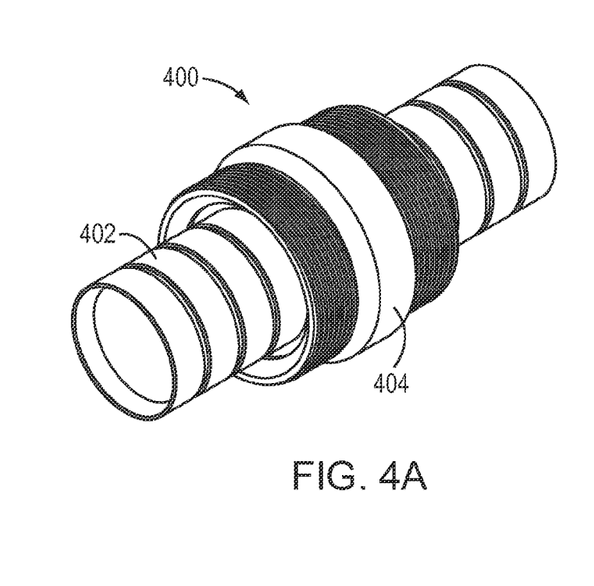
FIG. 4A is a schematic perspective view of a pipe-to-pipe connector, in accordance with another embodiment of the invention.
Figure 4B:
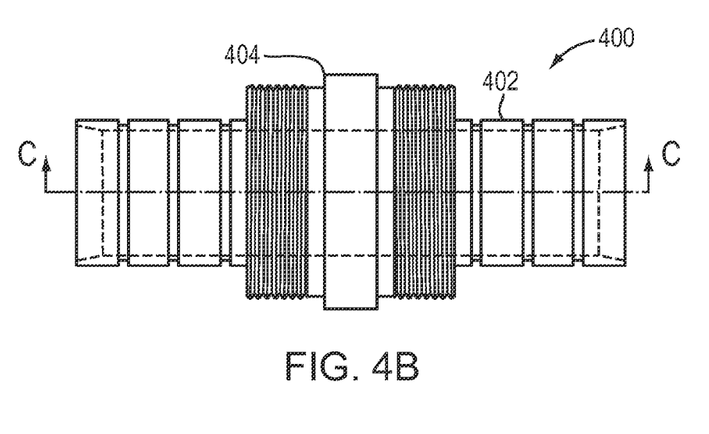
FIG. 4B is a schematic, transparent side view of the pipe-to-pipe connector depicted in FIG. 4A.
Figure 4C:
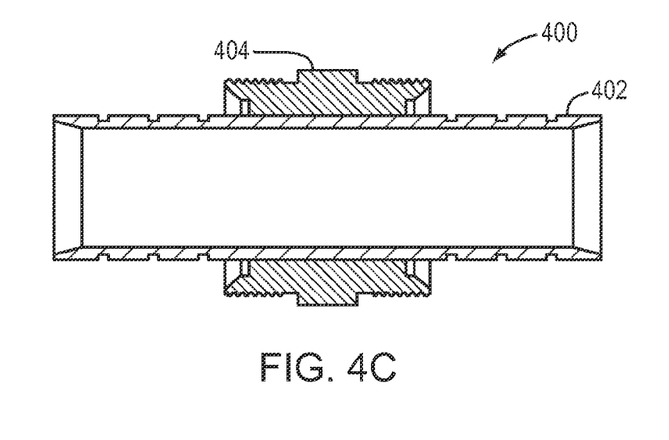
FIG. 4C is a schematic cross-section view of the pipe-to-pipe connector taken along the line C-C in FIG. 4B.

FIGS. 4A-4C depict a pipe-to-pipe connector 400 that is substantially similar to the service end connector 100, but instead of connecting a pipe to a different device the connector 400 connects pipes to each other. This may result in a substantially symmetrical appearance of the connector 400 as seen in the figures.

Figure 5A:
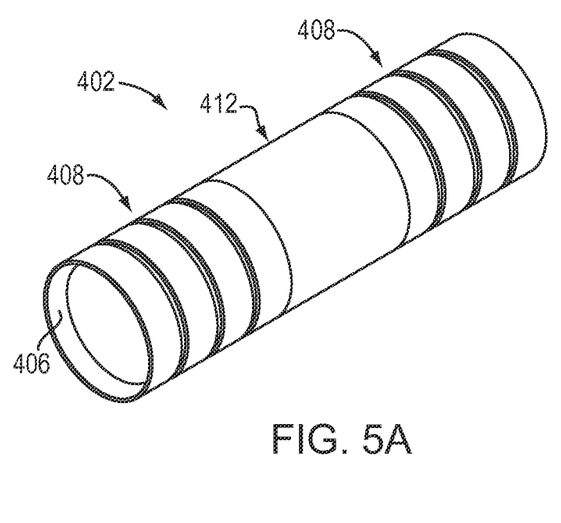
FIG. 5A is a schematic perspective view of a seal carrier of the pipe-to-pipe connector depicted in FIG. 4A.
Figure 5B:
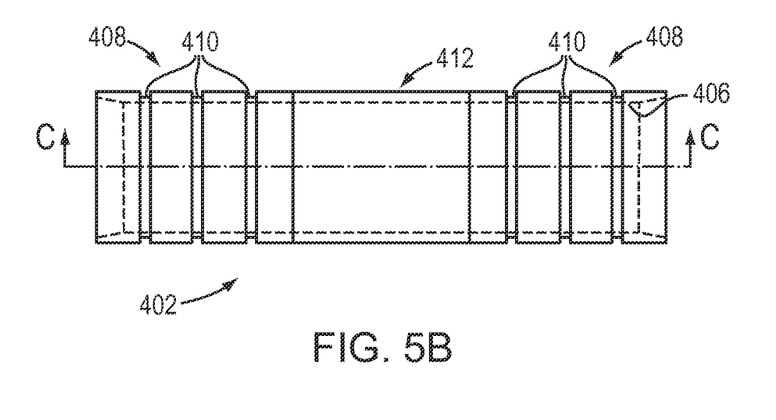
FIG. 5B is a schematic, transparent side view of the seal carrier depicted in FIG. 5A.
Figure 5C:
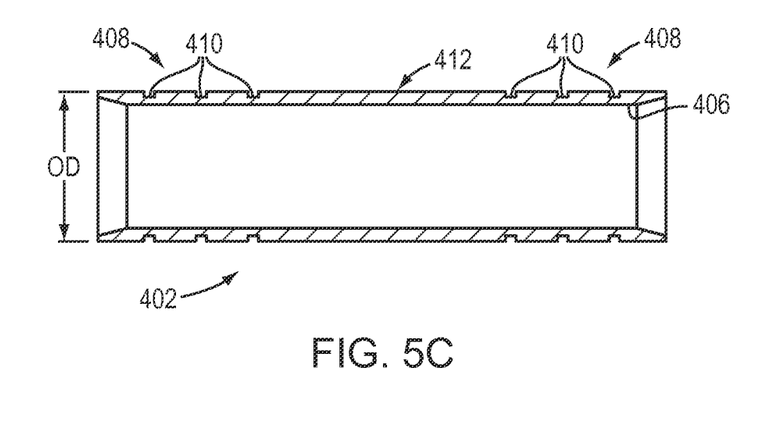
FIG. 5C is a schematic cross-section view of the seal carrier taken along the line C-C in FIG. 5B.
Figure 6A:
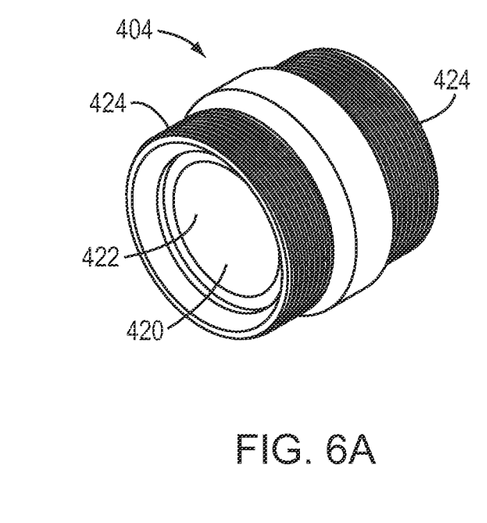
FIG. 6A is a schematic perspective view of an interconnect of the pipe-to-pipe connector depicted in FIG. 4A.
Figure 6B:
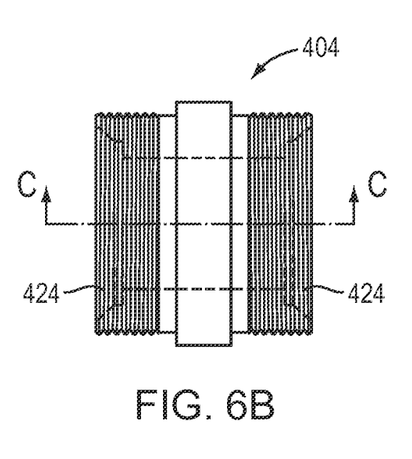
FIG. 6B is a schematic, transparent side view of the interconnect depicted in FIG. 6A.
Figure 6C:
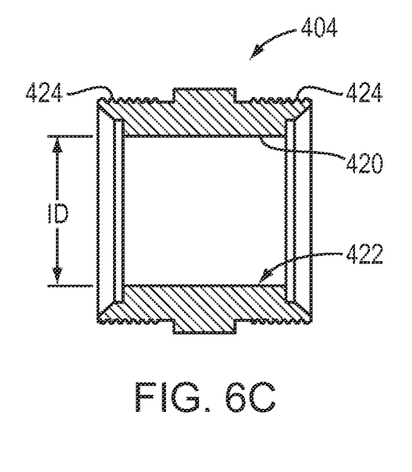
FIG. 6C is a schematic cross-section view of the interconnect taken along the line C-C in FIG. 6B.

A seal carrier 402, as seen in FIGS. 5A-5C, is similar to the seal carrier 102, though seal receiving portions 408 are disposed on opposite ends of the seal carrier 402 with a smooth first coupling surface 412 inbetween. The seal carrier 402 may have a fluid passage 406 and an outer diameter designated 'OD', along with grooves 410 in the seal receiving portions 408. An interconnect 404 depicted in FIGS. 6A-6C is similar to the interconnect 104, but the interconnect 404 has a smooth second coupling surface 422 and threaded third coupling surfaces 424 at opposite ends. The interconnect 404 defines a passage 420 with an inner diameter designated 'ID'. The inner diameter ID and the outer diameter OD are substantially similar so that the seal carrier 402 may be press fit into the interconnect 404. A protrusion or stop may be provided on the first coupling surface 412 and adapted for contact with a corresponding relief in the passage 420 the help provide accurate positioning.

Figure 7:
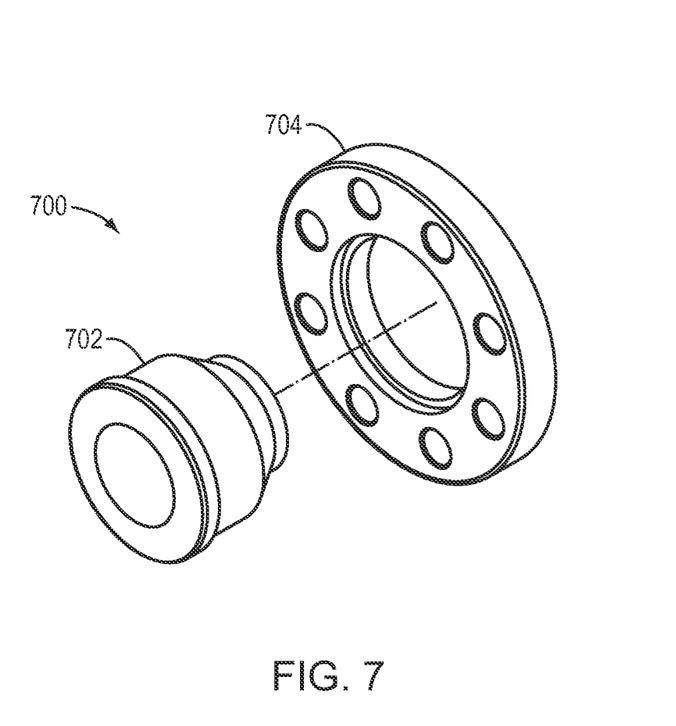
FIG. 7 is a schematic, exploded perspective view of a flange, in accordance with another embodiment of the invention.

FIG. 7 depicts a flange 700 with an insert 702 and an interconnect 704. The insert 702, as described in more detail below, is configured for insertion into other object (e.g., the interconnect 704), while the interconnect 704 is configured for attachment to a different component. The insert 702 and the interconnect 704 are depicted in FIG. 7 in a disconnected state, however in use they will be connected such that the flange 700 may appear to be of unitary construction.

Figure 8A:
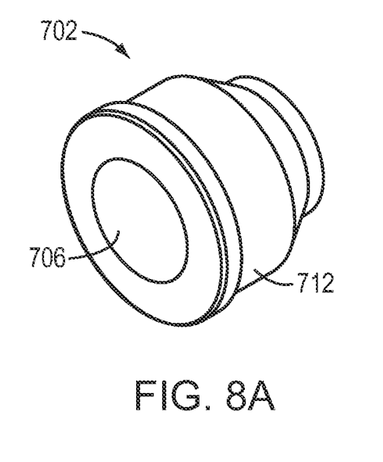
FIG. 8A is a schematic perspective view of an insert of the flange depicted in FIG. 7.
Figure 8B:
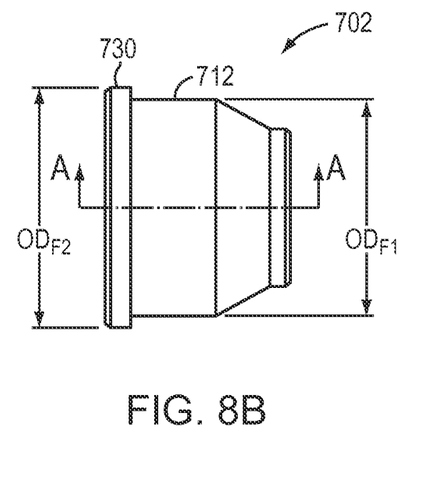
FIG. 8B is a schematic side view of the insert depicted in FIG. 8A.
Figure 8C:
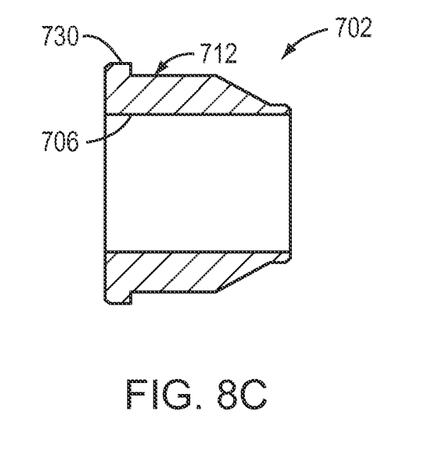
FIG. 8C is a schematic cross-section view of the insert taken along the line A-A in FIG. 8B.

The insert 702 depicted in FIGS. 8A-8C may be substantially cylindrical, with several features similar to the seal carriers 102, 402, such as a fluid passage 706 running the length of the insert 702, thereby providing an open path for the transfer of fluids, tools, and other objects and substances. A first insert coupling surface 712 having an outer diameter of dimension $OD_{F1}$ is configured for mating with the interconnect 704. A lip 730 having an outer diameter of dimension $OD_{F2}$ may be provided on an end of the insert 702 as a mechanical stop when inserted into the interconnect 704.

As the outer diameter $OD_{F2}$ of the lip 730 may be the largest diametrical dimension on the insert, bar stock of at least this size may be required.

Figure 9A:
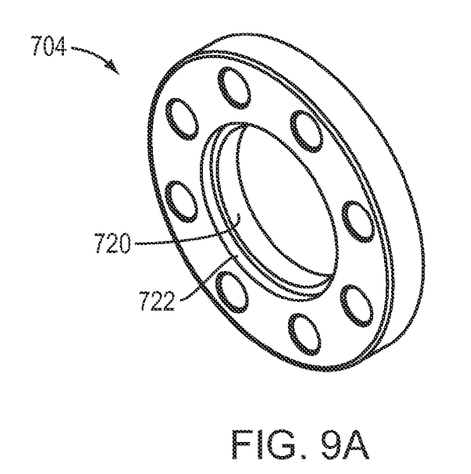
FIG. 9A is a schematic perspective view of an interconnect of the flange depicted in FIG. 7.
Figure 9B:
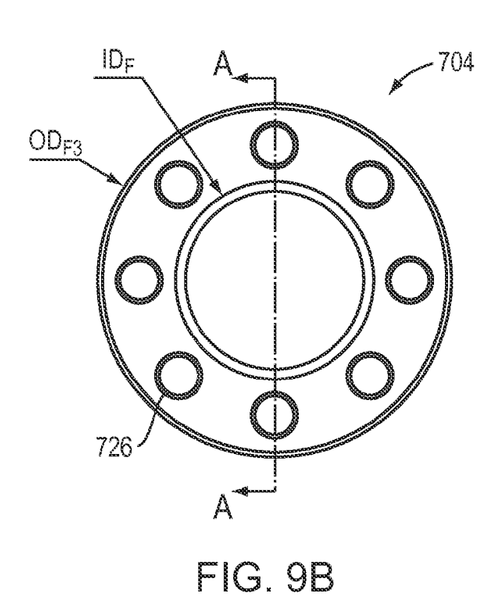
FIG. 9B is a schematic front view of the interconnect depicted in FIG. 9A.
Figure 9C:
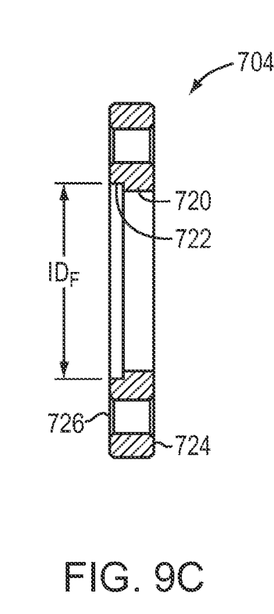
FIG. 9C is a schematic cross-section view of the interconnect taken along the line A-A in FIG. 9B.

The interconnect 704 depicted in FIGS. 9A-9C may also be substantially cylindrical and is configured for mating with other components. A middle portion of the interconnect 704 may be substantially open, forming a passage 720 to complement the passage 706 in providing a path for transportation through the flange 700. A second interconnect coupling surface 722 with an inner diameter $ID_F$ may be formed on the interior of the interconnect 704 and be sized to receive and mate with the first insert coupling surface 712. For example, the inner diameter $ID_F$ of the complementary second interconnect coupling surface 722 may be substantially the same as, or slightly greater than, the outer diameter $OD_{F1}$ of the first insert coupling surface 712. Several openings 726 may be provided on a third coupling surface 724 having an outer diameter $OD_{F3}$ of the interconnect 704 to facilitate attachment to other components, particularly those with a complementary bolt pattern. The openings 726 may be located in various standard or non-standard bolt patterns to enable attachment to various components.

As with the previously described embodiments, the insert 702 and the interconnect 704 may be made using a variety of methods and materials, and may come in a variety of sizes. For example, the insert 702 may be machined from a corrosion resistant material, such as stainless steel (e.g., 316L stainless steel), while the interconnect 704 is machined from a less corrosion resistant material, such as carbon steel (e.g., A105 carbon steel). Other formation methods and materials as described above may also be used. The insert 702 may range in size from as little as one inch to as much as twelve inches in diameter, and as short as a half inch to as much as twelve inches in length, although dimensions both below and above these ranges are possible. The interconnect 704 may range in size from as little as two inches to as much as eighteen inches in diameter, and as short as a quarter inch to as much as six inches in length, though again dimensions both below and above these ranges are possible.

For each of the service end connector 100, the pipe-to-pipe connector 400, and the flange 700, the narrower end is inserted into the end of a pipe (either with or without seals). In some circumstances this fit may be tight enough to be secure without additional support, while often another device (e.g., a clamp or nut) is provided for a secure fit. Each of the service end connector 100, the pipe-to-pipe connector 400, and the flange 700 may also be connected with another component (either before or after attachment to a pipe). The service end connector 100, the pipe-to-pipe connector 400, and the flange 700 each provide a pathway for production of fluid, transportation of tools, or other purpose considered desirable while the components are engaged.

Equivalents

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by the present invention.

The terms "a" and "an" and "the" used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A connector for coupling to a composite pipe, the connector comprising:
    a seal carrier having an inner surface defining a fluid passage, the seal carrier comprising:
        a first end and a second end;
        a seal receiving portion extending from the first end and comprising a cylindrical outer surface with a uniform diameter and a plurality of spaced-apart grooves formed in the outer surface, each groove configured to receive an annular seal, the seal receiving portion configured to be disposed within the composite pipe and the annular seals configured to seal between the composite pipe and the seal carrier; and
        a coupling portion extending from the second end to the seal receiving portion, the coupling portion comprising:
            a first cylindrical coupling surface on an outer seal carrier surface and comprising a threaded segment; and
            an end surface on the outer seal carrier surface, the end surface extending from the first coupling surface to the second end, wherein the end surface has a uniform diameter that does not exceed a maximum outer diameter of the seal carrier along the entire length of the end surface; and an interconnect defining a passage configured to receive the seal carrier, the interconnect comprising:
  a second cylindrical coupling surface on an inner interconnect surface comprising a threaded segment configured for coupling with the threaded segment of the first cylindrical coupling surface to connect the seal carrier and the interconnect;
  a third coupling surface on an outer interconnect surface,
  wherein the maximum outer diameter of the seal carrier is equal to or less than a minimum inner diameter of the interconnect exclusive of the first and second coupling surfaces; and
  wherein the first and second ends of the seal carrier are positioned outside of the interconnect when the threaded segments of the first and second cylindrical coupling surfaces are threaded together.

2. The connector of claim 1, wherein the seal carrier comprises a first material and the interconnect comprises a second material, wherein the second material is different from the first material.

3. The connector of claim 1, wherein the outer interconnect surface of the interconnect comprises a recessed segment, and wherein the recessed segment comprises the third coupling surface.

4. The connector of claim 1, wherein the interconnect comprises a first end and a second end, and wherein the second coupling surface extends to the first end and the third coupling surface extends to the second end.

5. The connector of claim 4, wherein the interconnect further comprises a portion between the first and second ends having an outer diameter that is greater than the outer diameter of the third coupling surface.

6. The connector of claim 2, wherein the first material comprises a material selected from the group consisting of stainless steel, carbon steel, corrosion resistant alloys, composites, coated materials, and combinations thereof.

7. The connector of claim 2 wherein the first material is stainless steel and the second material is carbon steel.

8. The connector of claim 1, wherein the third coupling surface comprises a threaded surface.

* * * * *